July 16, 1929.  E. A. ILEMAN  1,720,900
SAFETY ARRANGEMENT FOR FUEL BURNERS
Filed June 10, 1926
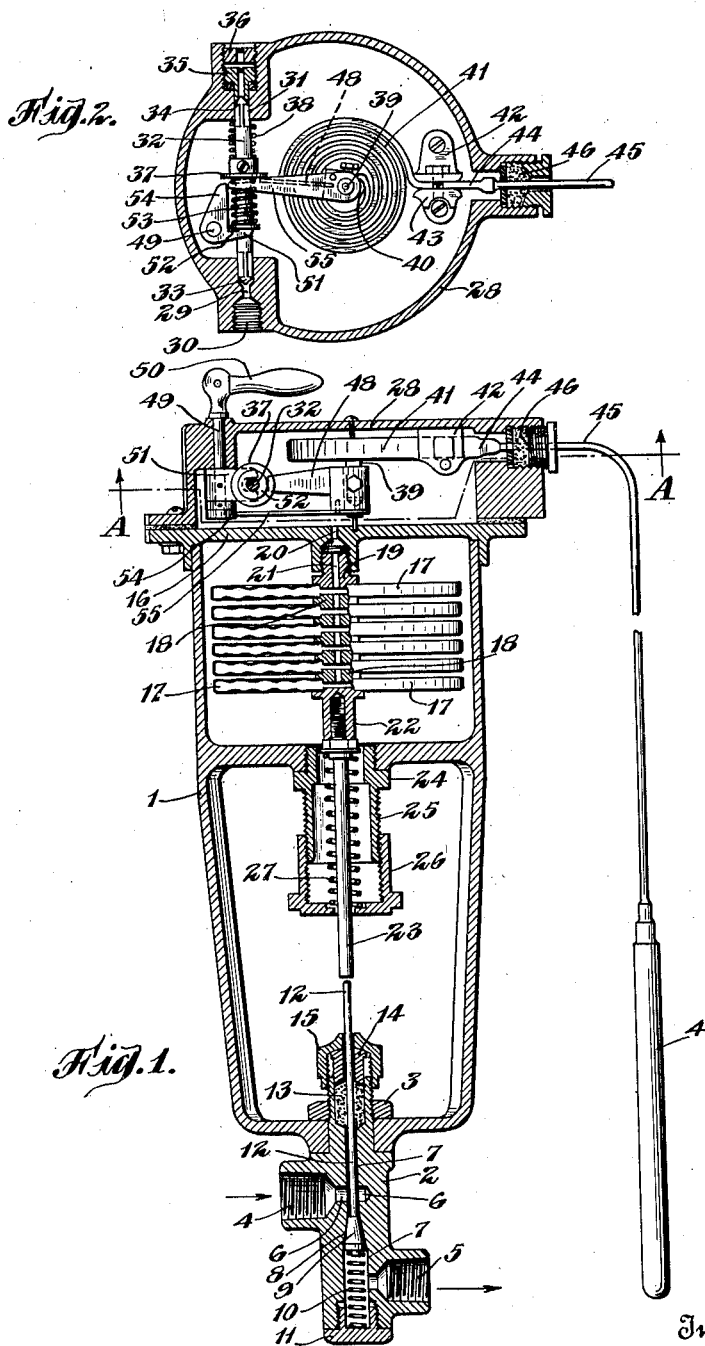
Inventor
Emil A. Ileman
By his Attorneys
Ward Crosby & Smith Patented July 16, 1929.

1,720,900

UNITED STATES PATENT OFFICE.

EMIL A. ILEMAN, OF NEW YORK, N. Y., ASSIGNOR, BY MESNE ASSIGNMENTS, TO CONSOLIDATED ASHCROFT HANCOCK COMPANY, INC., OF NEW YORK, N. Y., A CORPORATION OF DELAWARE.

SAFETY ARRANGEMENT FOR FUEL BURNERS.

Application filed June 10, 1926. Serial No. 114,915.

My invention relates to improvements in safety arrangements for fuel burners and more particularly for burners wherein a fluid fuel such as oil or gas is burned in connection with air or other equivalent fluid supplied under pressure. The main objects of the invention are to provide an arrangement wherein a more or less constant ratio between the flow of air and the flow of fuel is maintained with varying air pressure, and also to provide an arrangement in which the fuel supply is automatically shut off if for any reason the flame should be extinguished or the burner should go out.

Further and more specific objects, features and advantages will more clearly appear from the detail description below taken in connection with the accompanying sheet of drawings which illustrate an arrangement embodying my improvements in a preferred form thereof. In the drawings, Fig. 1 is a vertical section through the apparatus and Fig. 2 is a transverse section taken on the line A—A of Fig. 1.

Referring to the drawings, 1 represents a suitable framework having secured into the bottom thereof a pipe connection 2 by means of a nut 3. Pipe connection 2 is provided with a threaded recess at 4 to which is adapted to be connected a pipe leading from the fuel supply. Connection 2 is also provided with a threaded recess at 5 to which is adapted to be connected a pipe for conducting the fuel to the burner. The fuel may be fed to the connection 2 by gravity or by other form of feed. The threaded recesses 4 and 5 are connected by a transverse passageway 6 and vertical passageway 7 so that the fuel flowing in at 4 may flow through the pipe connection and out at 5 to the burner. The passageway 7 is provided with a conical seat at 8 adapted to receive a conical valve 9 normally held against the seat by a coil spring 10, the tension of which may be adjusted by screw-threaded member 11. The valve 9 is provided at its upper end with a spindle 12 passing up through packing 13 at the upper end of the pipe connection 2, the packing being held in place by collar 14 and nut 15.

Framework 1 is provided with a transverse cover plate 16 to the underneath side of which is secured an expansible air chamber comprising a series of hollow discs 17 preferably made out of sheet metal and secured together with apertured members 18. The upper disc 17 is secured to screw-threaded member 19 which is screw-threaded into a boss on the underneath side of plate 16, the plate 16 being provided with a hole 20 therethrough communicating with hole 21 in the member 19 so that air under pressure may be admitted to the expansible air chamber through the holes 20 and 21 and to each of the hollow discs 17 through the apertures in the connecting members 18. The lower disc 17 is connected to member 22 to which is secured a spindle 23. 24 represents a cylinder member screw-threaded to the framework and having a screw-threaded hollow portion 25 on which is screw-threaded a cup nut 26. A coil spring 27 has one end abutting the inside of the cup nut 26 while its other end abuts a member at the end of the spindle 23, so that the spring 27 tends to force the member 22 upwardly and collapse the air chamber or discs 17 but when air under sufficient pressure is admitted through the opening 20 the discs 17, which thus form a diaphragm motor, will expand against the action of spring 27 and force the spindle 23 downwardly. The bottom of the spindle 23 is adapted to engage the top of the spindle 12 so that this downward movement of the spindle 23 acts to move the spindle 12 downwardly and so open the valve 9 against the action of spring 10.

Arranged on top of the cover plate 16 is a substantially air tight chamber 28 provided with an inlet opening at 29 which by means of the screw-threaded portion 30 is adapted to be connected to the supply of air under pressure; that is, the air or other fluid which is supplied in the system under the pressure. 31 represents an exhaust opening to the outside atmosphere for the chamber 28. 32 represents a valve spindle carrying at one end a valve 33 adapted to open and close the opening 29 and at its other end a valve 34 adapted to open and close the opening 31 with the outside atmosphere. The seat of the valve 34 is provided on a screw-threaded member 35 screw-threaded into an opening in the side of the chamber 28 and held in place by lock nut member 36, the members 35 and 36 being apertured in order to permit the escape of air from the chamber 28 to the outside atmosphere when valve 34 is open. 37 represents a collar fixed to the valve spindle 32 and a coil spring 38 acts between the collar 37 and the frame of the chamber 28 to tend to force the valve spindle in a direction to close valve 33 and open valve 34. Suitably journaled in the chamber 28 is an axle member 39, the upper end of which is secured to the inner end 40 of a coil hollow spring 41, the outer end of which spring is rigidly secured to the chamber 28 by being clamped between brackets 42 and 43. Connected to the outer end 44 of the hollow spring 41 is a hollow metal flexible tube 45 passing out of the chamber 28 through a stuffing box 46. At its other end the tube 45 has connected to it a hollow bulb 47. The bulb 47, tube 45 and hollow metal spring 41 are filled with mercury and the bulb 47 is placed adjacent the burner so that it will be subjected to the heat from the burner whereupon when the burner is ignited the heat therefrom will expand the mercury in the bulb 47 and cause an increase in pressure of the mercury in the coil spring 41 which will expand said spring and rotate the axle member 39 in a clockwise direction as viewed in Fig. 2. When the flame of the burner goes out the bulb 47 will cool off and permit a corresponding contraction of the spring 41 and so rotate the axle member 39 in a counter-clockwise direction. 48 represents a flat leaf spring, one end of which is rigidly secured to the axle member 39 and the outer end of which is adapted to engage behind the collar 37, so that when the coil spring 41 is expanded by reason of the heat from the burner, the plate spring 48 will engage the collar 37 and move the collar 37 and spindle 32 in a direction to hold the valve 33 open and the valve 34 closed against the action of spring 38.

47 represents a shaft extending through the face of the chamber 28 and provided at its outer end with a manually operated handle member 50. Within the chamber 28, shaft 49 has rigidly secured thereto a forked arm 51, the forked portion of which is adapted to engage a collar 52 loose on the spindle 32. A coil spring 53 is arranged between the collar 52 and the collar 37. Also rigidly secured to the shaft 49 within the chamber 28 is an arm 54 and rigidly secured to the axle member 39 is a cooperating arm or locking member 55. The spring 53 is considerably stronger than the spring 38 so that when the handle member 50 is rotated in a counter-clockwise direction as viewed in Fig. 2 the arm 51 will raise the collar 52 and acting through the spring 53 will raise collar 37 against the action spring 38 and so open the valve 33 and close valve 34. This will also rotate the arm 54 and when the arm 54 slips by the end of locking arm 55, the arm 55 will drop slightly and so act as a dog which will hold the arm 54 in the position shown in Fig. 2 and thus hold valve 33 open and valve 34 closed.

In operation when it is desired to start the burner, the air pressure supply being connected at 30, the handle 50 is manually operated in order to move the collar 52 and through the spring 53 cause the valve 33 to be opened and the valve 34 to be closed against the action of spring 38. As above explained this movement also results in the locking arm 55 engaging the side of the arm 54 so as to lock the shaft 49 in this position and cause the arm 51 to hold the valve 33 open and the valve 34 closed. Thus air will be admitted under pressure into chamber 28 and this air pressure will be exerted through the passageways 20 and 21 and in the expansible air chamber which, when the pressure is sufficient, will expand against the action of spring 27 and upon the valve 9 against the action of spring 10 so as to permit the flow of fuel through the connection 2 to the burner. As the burner heats up it will heat the bulb 47 and when sufficiently heated it will cause an expansion of the hollow coil spring 41 which will rotate the axle member 39. This will cause the leaf spring 48 to press against the collar 37 with greater pressure as the axle 39 is rotated. As the axle member 39 is thus rotated, the arm 55 will finally become disengaged from the arm 54 but when this disengagement takes place the leaf spring 48 will act with sufficient power on the collar 37 to hold valve 33 open and the valve 34 closed against the action of spring 38. When, however, the locking arm 55 becomes disengaged from the arm 54, the spring 53 acting through collar 52 and on forked arm 51 will cause the shaft 49 to be rotated back to its original or starting position.

If now for any reason the flame of the burner should be extinguished, the bulb 47 will cool off causing a contraction of the coil spring 41 which will permit the axle 39 to rotate in a counter-clockwise direction and thus relieve the pressure which the flat spring 48 exerts on the collar 37 and so permit the valve 33 to be closed and the valve 34 to be opened under the action of spring 38. This shuts off the supply of air under pressure to the chamber 28 and opens said chamber to the atmosphere through the passageway 31 so that air under pressure is no longer supplied to the expansible air chamber formed of discs 17 and spring 27 will collapse said expansible air chamber and spring 10 will close valve 9 thus shutting off and discontinuing the flow of fuel to the burner. In this way not only is waste of fuel prevented but danger of fire or explosion from unconsumed fuel fed to the burner, is avoided in an efficient and satisfactory manner.

When the burner is operating the air pressure may for one reason or another vary somewhat and in such case it is desirable to vary the amount of fuel supplied accordingly in order that the fuel supply may be efficiently burned. This is adequately accomplished by the arrangement shown. If the air pressure increases thereby tending to supply a greater amount of air to the burner this will cause a greater expansion of the expansible members 17 which will cause the valve 9 to be opened to a greater extent and thus admit a correspondingly greater amount of fuel to the burner. If the air pressure should decrease to some extent, this will cause a corresponding collapsing of the expansible members 17 under the action of spring 27 thereby permitting the valve 9 to close to a corresponding extent under the action of spring 10 which will correspondingly cut down the flow of oil to the burner so that at all times a more or less constant ratio between the flow of air and the flow of oil to the burner is obtained with such varying air pressure.

While I have described my improvements in great detail and with respect to a preferred form thereof, I do not desire to be limited to such details or forms since many modifications and changes may be made, various parts omitted and the invention embodied in widely varying forms without departing from the spirit and scope thereof in its broader aspects. Hence I desire to cover all modifications and forms coming within the language or scope of any one or more of the appended claims.

What I claim as new and desire to secure by Letters Patent is:

1. A safety arrangement for fuel burners wherein a fluid is supplied under pressure, comprising a valve for controlling the flow of fuel to the burner, pressure operated means acting under the pressure of said fluid under pressure to control said valve, a valve for cutting off said fluid under pressure from said pressure operated means, and means acting responsive to a decrease in temperature at the burner for causing said last mentioned valve to be closed, and opening said pressure operated means to the atmosphere.

2. A safety arrangement for fuel burners having in combination a valve for controlling the flow of fuel to the burner, a spring acting on said valve, means responsive to temperature changes at the burner acting in opposition to said spring to maintain said valve in position to permit flow of fuel to the burner and acting upon decrease of temperature at the burner to permit the valve to move to a position such that it causes flow of fuel to the burner to be stopped, manually operated means acting on said valve in position to said spring to cause flow of fuel to the burner to be reestablished, and means locking said manually operated means in position to hold said valve in position to permit flow of fuel to the burner until said temperature responsive means acts to hold said valve in position to permit flow of fuel to the burner.

3. A safety arrangement for fuel burners having in combination means controlling the flow of fuel to the burner, means responsive to temperature changes controlling said first mentioned means to cause flow of fuel to the burner and acting upon a change in temperature to cause flow of fuel to the burner to be stopped, manually operated means acting on said first mentioned means for permitting flow of fuel to the burner and means locking said manually operated means in position to permit flow of fuel to the burner until said temperature responsive means acts to permit flow of fuel to the burner, and means whereby, when said temperature responsive means acts to permit flow of fuel to the burner, said manually operated means is released and no longer acts to permit flow of fuel to the burner.

4. A safety arrangement for fuel burners having in combination a valve for controlling the supply of fuel to the burner, a spring acting on said valve tending to maintain it in position to cause flow of fuel to the burner to be stopped, pressure operated means acting in opposition to the spring to cause said valve to assume a position to cause flow of fuel to the burner, means controlling said pressure operated means responsive to temperature changes at the burner, and acting upon the burner going out to cause the pressure operated means to control the valve to stop flow of fuel to the burner, manually operated means for operating said valve to cause fuel to be supplied to the burner, means controlled by said pressure operated means for locking said manually operated means in position to cause flow of fuel to the burner, and means whereby, when said pressure operated means acts responsive to said temperature responsive means to permit flow of fuel to the burner, said manually operated means is released and no longer holds said valve in position to cause flow of fuel to the burner.

5. A safety arrangement for fluid fuel burners wherein air under pressure is supplied to the fuel to be burned, comprising means for controlling the supply of fuel to the burner, an expansible air chamber connected to the air supply under pressure, means whereby expansion of said chamber will control said first mentioned means to cause supply of fuel to the burner and contraction of said chamber will cause flow of fuel to the burner to cease responsive to a decrease in the pressure of said air supply, a valve for controlling the admission of air under pressure from said air supply to said chamber, a spring tending to close said valve, means responsive to temperature changes at the burner acting in opposition to said spring to maintain said valve in position to permit flow of fuel to the burner and acting upon decrease of temperature at the burner to permit the valve to move to a position such that it causes flow of fuel to the burner to be stopped and manually operated means acting on said valve to cause flow of fuel to the burner to be reestablished.

6. A safety arrangement for fluid fuel burners wherein air under pressure is supplied to the fuel to be burned, comprising means for controlling the supply of fuel to the burner, an expansible air chamber connected to the air supply under pressure, means whereby expansion of said chamber will control said first mentioned means to cause supply of fuel to the burner and contraction of said chamber will cause flow of fuel to the burner to cease responsive to a decrease in the pressure of said air supply, a valve for controlling the admission of air under pressure from said air supply to said chamber, a spring tending to close said valve, means responsive to temperature changes at the burner acting in opposition to said spring to maintain said valve in position to permit flow of fuel to the burner and acting upon decrease of temperature at the burner to permit the valve to move to a position such that it causes flow of fuel to the burner to be stopped, manually operated means acting on said valve to cause flow of fuel to the burner to be reestablished, and means whereby, when said temperature responsive means acts to permit flow of fuel to the burner, said manually operated means is released and no longer acts to permit flow of fuel to the burner.

7. A safety arrangement for fluid fuel burners wherein air under pressure is supplied to the fuel to be burned, comprising means for controlling the supply of fuel to the burner, an expansible air chamber connected to the air supply under pressure, means whereby expansion of said chamber will control said first mentioned means to cause supply of fuel to the burner and contraction of said chamber will cause flow of fuel to the burner to cease responsive to a decrease in the pressure of said air supply, a valve for controlling the admission of air under pressure from said air supply to said chamber, a spring tending to close said valve, pressure operated means acting in opposition to the spring to cause said valve to assume a position to cause flow of fuel to the burner, means controlling said pressure operated means responsive to temperature changes at the burner, and acting upon the burner going out to cause the pressure operated means to control the valve to stop flow of fuel to the burner, and manually operated means for operating said valve to cause fuel to be supplied to the burner, means controlled by said pressure operated means for locking said manually operated means in position to cause flow of fuel to the burner and means whereby, when said pressure operated means acts responsive to said temperature responsive means to permit flow of fuel to the burner, said manually operated means is released and no longer holds said valve in position to cause flow of fuel to the burner.

8. A safety arrangement for fluid fuel burners wherein air under pressure is supplied to the fuel to be burned, comprising means for controlling the supply of fuel to the burner, an expansible air chamber connected to the air supply under pressure, means whereby expansion of said chamber will control said first mentioned means to cause supply of fuel to the burner and contraction of said chamber will cause flow of fuel to the burner to cease responsive to a decrease in the pressure of said air supply, a valve for controlling the admission of air under pressure from said air supply to said chamber, a spring tending to close said valve, and means whereby, when said temperature responsive means acts to cause flow of fuel to the burner, said manually operated means is released and no longer acts to permit flow of fuel to the burner, and means whereby when said valve closes off said expansible air chamber from said air supply said expansible air chamber is opened to the outside atmosphere.

9. The combination of a fluid motor, controlling the supply of fuel to a burner, a valve controlling the supply of fluid under pressure to said motor, manually operated means for operating said valve to one position, means for locking said manually operated means in said position, means responsive to temperature variations for releasing said locking means and holding said valve in the position to which it was moved by the manually operated means, but permitting the valve to be moved in the opposite direction responsive to certain temperature variations.

10. The combination of a fluid motor, controlling the supply of fuel to a motor, valve means for controlling the supply of fluid under pressure to said motor and exhausting said motor to the atmosphere, manually operated means which when moved to one position, operates said valve means to cause fluid under pressure to be admitted to said motor and the exhaust from said motor to be closed, means for automatically locking said manually operated means in said position, and means acting responsive to temperature variations for releasing said locking means and holding said valve means in said position independently of the manually operated means, but permitting the valve means to be moved to shut off the supply of fluid under pressure from said motor and exhaust said motor to the atmosphere responsive to certain decreases in temperature.

In testimony whereof I have signed my name to this specification.

EMIL A. ILEMAN.

CERTIFICATE OF CORRECTION.

Patent No. 1,720,900.  Granted July 16, 1929, to

EMIL A. ILEMAN.

It is hereby certified that error appears in the printed specification of the above numbered patent requiring correction as follows: Page 4, line 102, claim 10, for the word "motor" read "burner"; and that the said Letters Patent should be read with this correction therein that the same may conform to the record of the case in the Patent Office.

Signed and sealed this 22nd day of October, A. D. 1929.

(Seal)

M. J. Moore,
Acting Commissioner of Patents.